United States Patent
Brown et al.

(10) Patent No.: US 12,053,114 B1
(45) Date of Patent: Aug. 6, 2024

(54) PRESSURE-ACTIVATED BEVERAGE CAP FOR BEVERAGE FILTER PRESS

(71) Applicant: AeroPress, Inc., Palo Alto, CA (US)

(72) Inventors: Matthew Brown, Raleigh, NC (US); Dale Woiken, Upland, CA (US); Edmund Lee, Encino, CA (US)

(73) Assignee: AeroPress, Inc., Palo Alto, CA (US)

( * ) Notice: Subject to any disclaimer, the term of this patent is extended or adjusted under 35 U.S.C. 154(b) by 0 days.

(21) Appl. No.: 18/099,790

(22) Filed: Jan. 20, 2023

(51) Int. Cl.
*A47J 31/38* (2006.01)

(52) U.S. Cl.
CPC ..................... *A47J 31/38* (2013.01)

(58) Field of Classification Search
CPC ........................................... A47J 31/38
See application file for complete search history.

(56) References Cited

U.S. PATENT DOCUMENTS

| | | | |
|---|---|---|---|
| 4,882,982 A * | 11/1989 | Muttoni | A47J 31/0605 99/295 |
| 4,921,712 A | 5/1990 | Malmquist | |
| 5,913,962 A * | 6/1999 | Gasser | A47J 31/4464 99/302 R |
| 6,571,686 B1 | 6/2003 | Riley et al. | |
| 6,711,988 B1 | 3/2004 | Eugster | |
| 7,849,784 B2 | 12/2010 | Adler | |
| 8,180,204 B2 | 5/2012 | Glucksman et al. | |
| 8,663,724 B1 | 3/2014 | Banasik | |
| 9,932,168 B2 | 4/2018 | Hansen | |
| 11,497,343 B2 | 11/2022 | Kuempel | |
| 2007/0186784 A1 * | 8/2007 | Liverani | A47J 31/0668 99/295 |

(Continued)

FOREIGN PATENT DOCUMENTS

| | | |
|---|---|---|
| CN | 217817615 U | 11/2022 |
| DE | 19711025 C1 | 5/1998 |

(Continued)

OTHER PUBLICATIONS

AeroPress Coffee Maker, Available Online at: https://aeropress.com/, Accessed from Internet on Mar. 17, 2023, pp. 1-11.

(Continued)

*Primary Examiner* — Jimmy Chou
(74) *Attorney, Agent, or Firm* — Kilpatrick Townsend & Stockton LLP

(57) ABSTRACT

A beverage cap with pressure-activate valve for use with a beverage filter press having a hollow cylinder and removable piston that when pressed downward forces liquid through the cylinder and beverage cap into an open vessel. The beverage cap includes a plurality of protrusions that are discontinuous and distributed through the cavity of the cap so as to improve filter support and distribute pressure more uniformly through the cavity and along the filter, thereby allowing use of thin paper filters and avoiding tearing or blow out. The beverage cap can include a removable valve insert that includes a valve body supporting a movable vale and one or more support members that further support the filter at a central valve region, further reinforcing the filter to avoid blow out of paper filters. The beverage cap and beverage cap are suited for pressing of tea or coffee beverages, especially espresso.

30 Claims, 14 Drawing Sheets

(56) References Cited

U.S. PATENT DOCUMENTS

| | | | |
|---|---|---|---|
| 2010/0236420 A1* | 9/2010 | Remo | A47J 31/0657 |
| | | | 99/299 |
| 2014/0161945 A1 | 6/2014 | Ciaramelli | |
| 2018/0044105 A1* | 2/2018 | Tomasi | B65D 77/2024 |
| 2019/0001187 A1* | 1/2019 | Costella | A63B 71/0622 |
| 2019/0021541 A1* | 1/2019 | Kuempel | A47J 31/36 |
| 2020/0405089 A1* | 12/2020 | Constantine | A47J 31/02 |
| 2021/0354889 A1 | 11/2021 | Wong et al. | |

FOREIGN PATENT DOCUMENTS

| | | |
|---|---|---|
| EP | 0459323 A2 | 12/1991 |
| EP | 0919171 A1 | 6/1999 |
| EP | 1319357 A2 | 6/2003 |
| WO | 2012004430 A1 | 1/2012 |

OTHER PUBLICATIONS

Cafflano® Kompresso, A Portable Authentic Espresso Maker, Available Online at: https://www.kickstarter.com/projects/cafflano/cafflano-kompresso-a-portable-authentic-espresso-m, Accessed from Internet on Mar. 23, 2023, pp. 1-19.

Simpresso—Enjoy Espresso Beverages Anytime @ Anywhere, Available Online at: https://www.kickstarter.com/projects/simposh/simpresso-enjoy-espresso-beverages-anytime-anywher-1, Accessed from Internet on Mar. 23, 2023, pp. 1-20.

\* cited by examiner

PRESSURE-ACTIVATED BEVERAGE CAP FOR BEVERAGE FILTER PRESS

BACKGROUND OF THE INVENTION

The present invention relates generally to beverage makers and more specifically to pressure-activated beverage cap for making beverages, such as coffee, tea or espresso, with a beverage press.

Currently marketed products include beverage filter presses that include a cap with a pressure-activated valve to facilitate beverage making at increased pressure, which is suited for certain types of drinks, such as espresso. Conventional caps typically include standoff ridges within an interior portion of the cap that extending radially from an outer periphery to the pressure-activate valve at the center to support a metal filter and define radial flow paths that direct the pressurized flow to the central valve. Such caps generally use perforated metal filters that sit atop the radial ridges of the cap and are generally unsuitable for use with paper filters due to tearing and blowout of that occurs when paper filters are subjected to high pressures. Additionally, the high pressure subjects the valve to wear and tear over time. Since paper filters have a number of advantages over metal filters, there is a need for improved pressure-activated beverage caps for beverage filter presses that allow use of paper filters. There is further need for pressure-activated beverage caps that improve ease of use and longevity of the beverage cap and components as well as improve beverage making.

SUMMARY OF THE INVENTION

In one aspect, the invention pertains to a beverage cap for a beverage filter press. Such beverage caps can include: a main body having an upper side and a lower side, the upper side having an open cavity for receiving a filter therein, where the main body is configured to releasably couple with a cylinder of a beverage press and enclose a bottom opening of the cylinder when coupled thereto, the cavity having a bottom surface and a central hole with a pressure-activated valve to facilitate passage of fluid during filtering with the press. The pressure-activated valve is disposed within the main body and the pressure-activate valve is configured in a closed configuration when pressure within the cavity during filtering with the press is less than a minimum pressure and to assume an open configuration to facilitate fluid flow therethrough when the pressure during filtering with the press is greater than the minimum pressure. In some embodiments, the pressure-activated valve is removably coupled within the main body by tabs configured to couple by a snap-fit. The main body includes a plurality of protrusions or projections extending upwards from the bottom surface in the open cavity to support a filter. In some embodiments, the plurality of projections are discontinuous and distributed across the interior surface so as to distribute pressurized fluid flow within the cap and inhibit blow when used with a paper filter.

In some embodiments, the plurality of protrusions are disposed on between 40 and 60% of the bottom surface of the open cavity. In some embodiments, plurality of protrusions are discontinuous and distributed in a substantially regular pattern across the interior surface. In some embodiments, each of the plurality of protrusions has a largest lateral dimension of about 0.5 inch or less. In some embodiments, each of the plurality of protrusions has a top surface area of about 0.25 square inches or less. In some embodiments, the protrusion extend upwards between 0.2 inches and 0.7 inches, typically between 0.3 inches and 0.5 inches. In some embodiments, each of the plurality of protrusions comprises a plurality of elongated shapes that alternate between differing orientations. In some embodiments, the plurality of protrusions are arranged to avoid any direct flow path from an outer periphery of the open cavity and the central opening, thereby distributing pressure along within the cavity and along the filter. The plurality of protrusions can be arranged so that a distance between protrusions is within a range between 0.05 inches and 0.4 inches, preferably between 0.05 and 0.3 inches, more preferably between 0.05 and 0.2 inches. In some embodiments, each of the plurality of protrusions are spaced at regular intervals throughout the cavity in a staggered pattern In some embodiments, a staggered pattern or a seemingly random arrangement of the protrusions in the beverage cap increases pressure and turbulence in the inner cavity of the beverage cap during pressing. This configuration can result in a better, superior crema layer as compared to conventional beverage caps having linear flow channels.

In some embodiments, the beverage cap includes a removable valve insert that includes the pressure-activated valve. The removable valve insert can include: a valve body; a movable valve member attached to and supported by the valve body, where the movable valve member is movable between the open and closed configuration to facilitate flow therethrough; and one or more support members extending upwards to support the filter above and/or adjacent to the movable membrane. In some embodiments, the valve insert includes three or more support members (e.g. four supports, five supports, six supports, etc.) distributed around the movable valve member.

In another aspect, the invention pertains to a beverage press assembly including: a hollow cylinder having top and bottom openings; a removable piston inserted into the top opening and pressed downward to force liquid in the cylinder and a beverage cap removably coupled with and enclosing the bottom opening of the hollow cylinder. The beverage cap includes a plurality of protrusions distributed throughout the cavity to support the filter and arranged to provide more uniform pressure flow throughout the cavity. In some embodiments, the protrusions are discontinuous and arranged to substantially avoid any direct flow paths or relatively large open voids within the cavity to prevent blow out. In some embodiments, the beverage cap includes a plurality of male tabs along an outer periphery that are received within corresponding recesses of a support extending laterally from the hollow cylinder near the bottom opening.

In yet another aspect, the invention pertains to a removable valve insert for a beverage cup. Such valve inserts can include: a valve body; a movable valve member attached to and supported by the valve body, where the valve member is configured with a closed configuration when upstream pressure is less than a minimum pressure and to assume an open configuration to facilitate fluid flow therethrough when the upstream pressure is greater than the minimum pressure; and one or more support members extending upwards from the valve body to support a filter above and/or adjacent to the movable membrane during pressing of a beverage when the valve insert is attached within a beverage cap sealingly coupled with a beverage press. In some embodiments, the valve insert can include three or more support members (e.g. four supports, five supports, six supports, etc.) distributed about the movable valve member disposed at a center of the valve body. In some embodiments, the valve body and the one or more support members are integrally formed, such as by injection molding. In some embodiments, the valve body and the one or more support members are formed of a rigid or semi-rigid plastic or elastomer. The movable valve member can be defined by a flexible membrane having one or more slits defined therein.

In still another aspect, the invention pertains to methods of filter pressing a beverage using a beverage press with a beverage cap described herein to better support a filter, in particular a paper filter, and provide more uniform distribution of pressure to avoid blow out of the paper filter.

A further understanding of the nature and advantages of the present invention may be realized by reference to the remaining portions of the specification and the drawings.

DETAILED DESCRIPTION

Figure 1A:
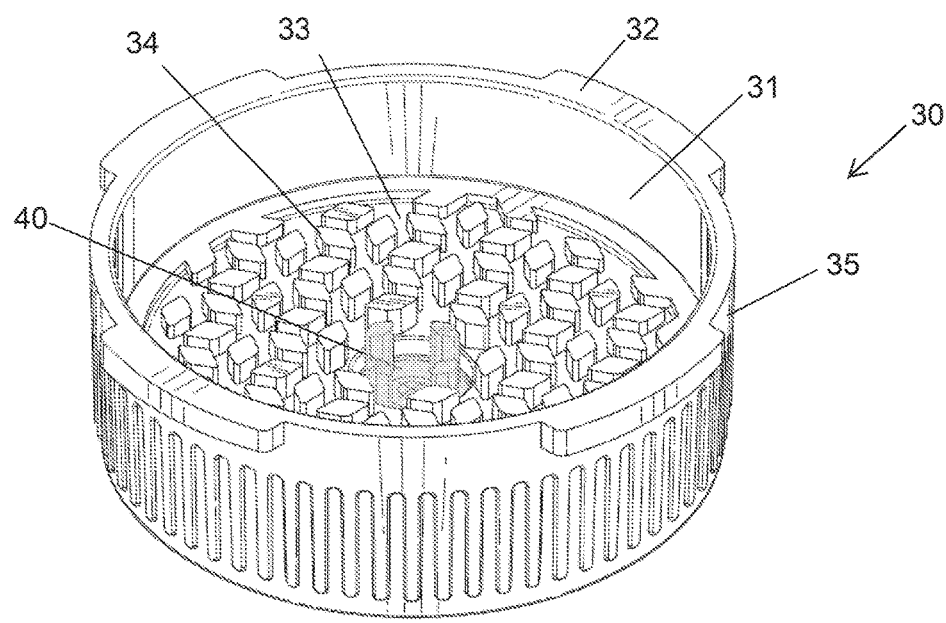
FIGS. 1A-1B show an improved beverage cap with pressure-activated valve, in accordance with some embodiments.

The present invention relates generally to beverage makers and more specifically to pressure-activated beverage caps for beverage presses for making beverages, such as tea and coffee beverages, such as espresso.

In one aspect, the beverage cap includes a open cavity with a pressure-activated valve and multiple protrusions extending upwards from the bottom surface of the cavity, the protrusions being arranged and dimensioned to provide improved support of the filter and more uniform distribution of pressure throughout the cavity during pressing with a beverage press. In some embodiments, the improved support and uniformity of pressure distribution provided by the arrangement and design of the protrusions allows of use of a paper filter.

In another aspect, the beverage cap includes a pressure-activated valve as a removable valve insert. In some embodiments, the valve insert can be removed and replaced by the end-user as needed. The valve insert can include coupling features to removably secure the valve with the beverage cup. The valve insert can include a valve body supporting a movable valve and having support members extending upwards from valve body to provide additional support for the filter above and/or directly adjacent the movable valve. In some embodiments, the support members provide additional support within the valve region to allow the filter to withstand increased forces in the valve region, thereby allowing for use of a paper filter. In some embodiments, the valve insert includes a valve body with movable valve membrane that is inserted directly into the beverage cap without any intervening components. In some embodiments, the valve insert includes a valve body with movable valve membrane and a gasket disposed about the valve body.

Currently, beverage filter presses on the market can include a cap with a pressure-activated valve to facilitate beverage making at increased pressures, which is particularly suited for certain types of drinks, such as espresso. Conventional caps typically include standoff ridges within an interior portion of the cap extending radially between an outer circumference and the pressure-activate valve at the center to support a filter and define radial flow paths that direct the pressurized flow to the central valve. Such caps typically use perforated metal filters that sit atop the radial ridges of the cap, and are generally unsuitable for use with paper filters due to perforation and blowout of the filter due to the increased pressures. Paper filters have a number of advantages over metal filters, such as the ability to absorb fines and compounds that contribute to bitterness, lower cost, and ease of cleanup since paper filters are disposable. However, paper filters present certain challenges since paper filters are considerably thinner and less robust than metal filters. Typically, paper filters are between about 100 um to 250 um. The paper, textile, or cloth material of the filter are typically formed of fibers that can be woven or non-woven, there being pores between fibers that filter the fluid passed through. Pore sizes in paper filters are generally between 10 and 150 um, most pores being about 50 um. Total pore area is generally between 0.25 and 0.45%, typically between 0.25-0.4%. Additional details regarding filters made from paper, textile or cloth can be found in "An In-Depth Analysis of Coffee Filters" (available online at https://coffeeadastra.com/2019/08/04/an-in-depth-analysis-of-coffee-filters-2/), incorporated herein by reference for all purposes. Any of these paper, textile or cloth filters can be used with the improved beverage cap described herein.

These paper filters are well suited for making regular coffee or tea in a press with a standard perforated beverage cap (without any pressure-activated valve) in a standard beverage pressing process producing between 0.25 and 0.5 bars of pressure. However, when making more concentrated beverage, such as espresso, in a higher pressure process, using a beverage cap having a pressure-activated valve increases the pressure within the cavity between 5-30%, which tends to cause paper filters to "blow out." That is, the fibers defining the pores separate or tear causing one or more pores to greatly expand, letting any filtered fines and compounds through the valve into the coffee rendering the filter ineffective. This is a recurring problem when attempting to use standard paper filters with conventional beverage caps having pressure-activated valves. Typically, conventional beverage caps include ridges defining flow paths to direct the fluid to the valve. Upon extensive testing, it was noted that tears or enlargement of pores associated with blowout tended to occur in areas where the filter was subjected to heightened pressure, often occurring above the valve and along the flow paths. Due to this recurring problem, conventional beverage caps are provided with standard metal filters that can withstand the heightened and variable pressures associated with this approach. However, even with metal filters, these variations in pressures still exist, which can cause uneven flow of pressurized fluid through the puck of coffee grounds, which can adversely affect the resulting coffee product.

Advantageously, the beverage cap provided herein overcomes the above noted challenges by incorporating a plurality of relatively small protrusions within the interior cavity that support the filter and improve distribution of pressure throughout the interior cavity during pressing. In some embodiments, the protrusions are arranged to avoid direct flow paths to the center valve, thereby improving distribution of pressure, improving uniformity and avoiding uneven pressure zones that contribute to "blow out" of paper filters. In another aspect, the beverage cap further inhibits blow out above the valve region by utilizing a valve insert having additional support members that support the filter in the region above or directly adjacent the pressure-activated valve, thereby providing further reinforcement in this region to avoid blow out. In some embodiments, the support members of the valve insert are more closely spaced than the protrusions of the main body of the beverage cap. As noted above, filter blowouts in conventional beverage cap designs typically occurred where there was a large gap between supports, particularly above the valve, such that the current beverage cap design described herein reduces these gaps with the innovative valve insert design and arrangement of protrusions to avoid filter blowouts in paper filters.

In another aspect, the arrangement of the protrusions provides more even application of pressure, thereby facilitating more uniform flow of pressurized fluid throughout the entire puck of tea leaves or coffee grounds in the interior cavity, as opposed to directing flow primarily to specific areas along designated flow paths are in the center. The result is the beverage cap can provide improved filtering and enhanced flavor as compared to beverage cap designs with open voids at the center and along designated flow paths.

Figure 1B:
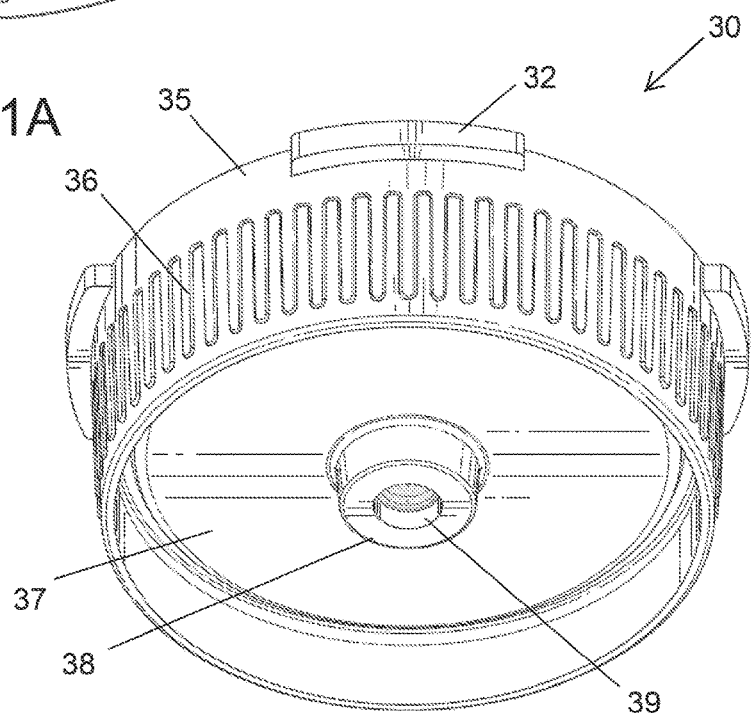
Figure 2:
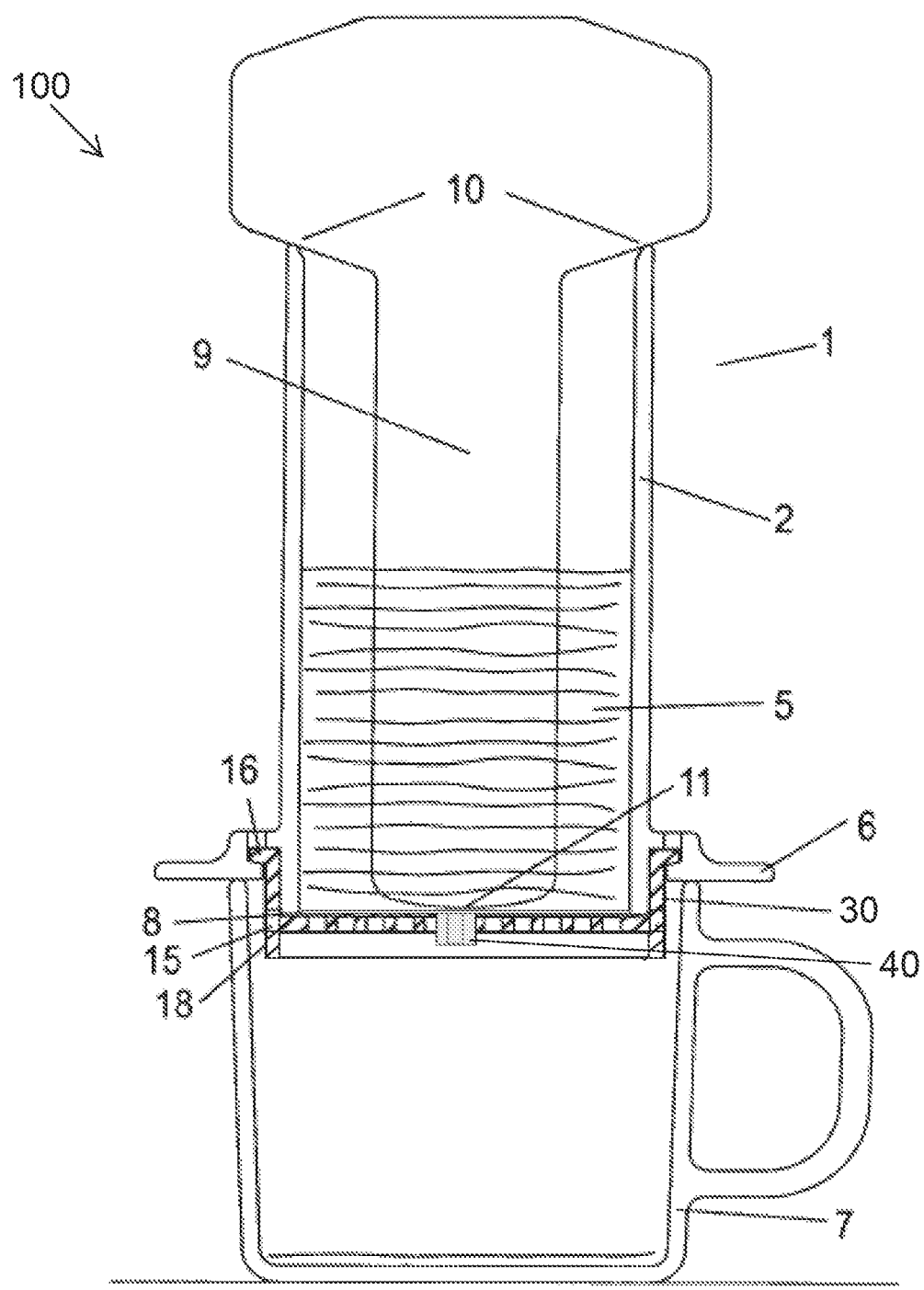
FIG. 2 illustrates a beverage press with a pressure-activated beverage cap according to some embodiments, where the press is resting on a cup with a mixing paddle deployed in the press during an initial mixing stage.
Figure 3:
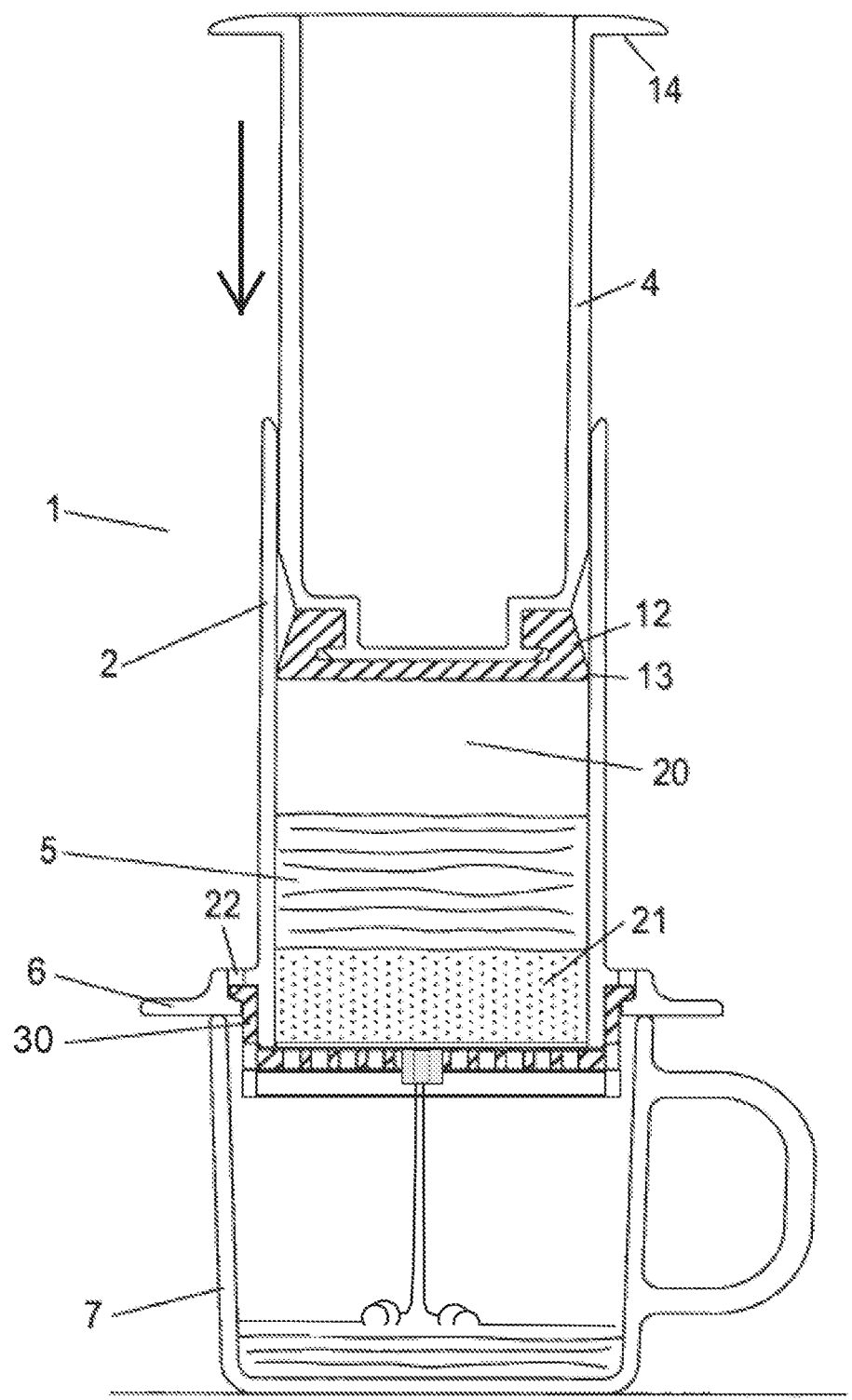
FIG. 3 illustrates the beverage press of FIG. 2 with the piston being pressured down into the cylinder during the pressing stage.
Figure 4:
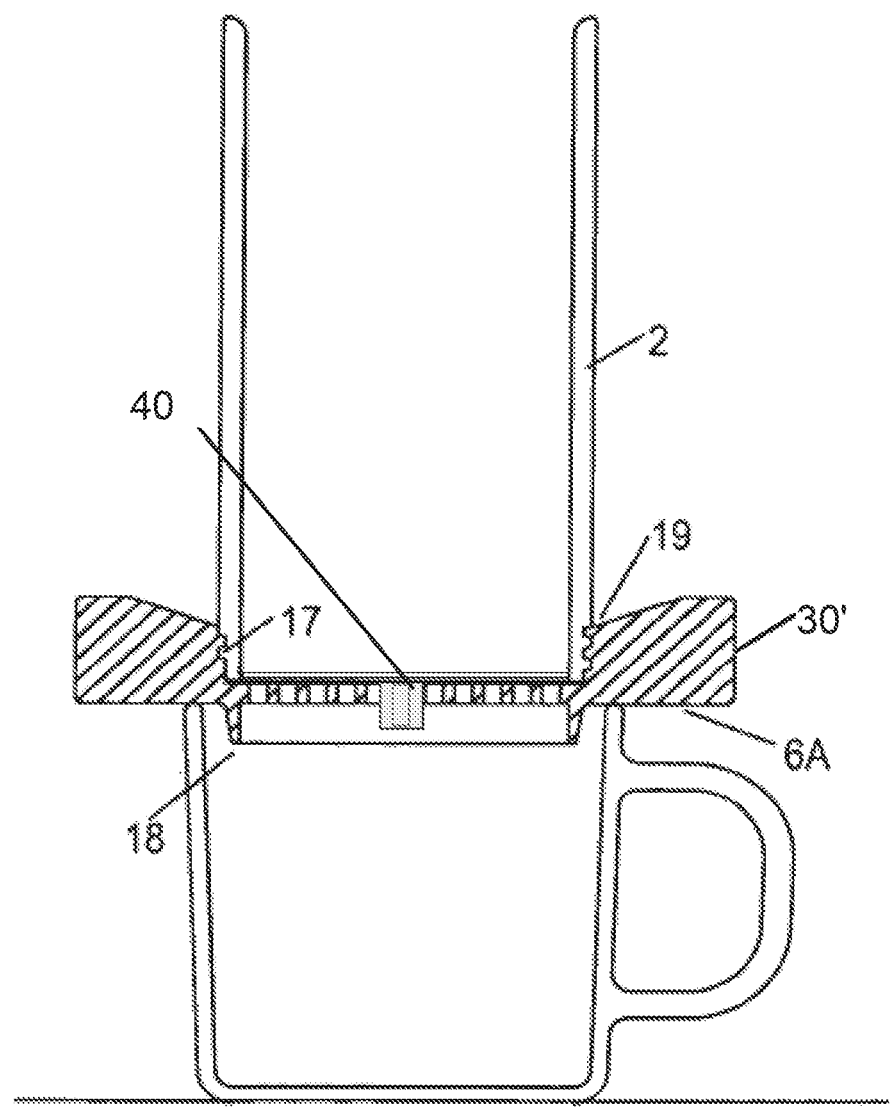
FIG. 4 illustrates an alternative version of a beverage press with a beverage cap having a support extending radially outward, in accordance with some embodiments.

FIGS. 1A-1B show an improved beverage cap 30 with pressure-activated valve, in accordance with some embodiments. The beverage cap 30 is designed to releasably couple with the cylinder of a beverage press, as shown in FIGS. 2-4, so that the beverage cap encloses the distal opening of the press cylinder and filters the beverage through a filter supported in the cap during pressing of the beverage press. The beverage cap 30 is designed to couple with the beverage press by male tabs 32 that engage with corresponding female recesses in the press that engage and tighten upon rotation to secure the cap to the press.

As shown in FIG. 1A, the beverage cap 30 includes a vessel or main body 35 that defines an interior cavity 31 that opens in an upward direction, the interior cavity being shaped and dimensioned to hold a filter and a compressed puck of coffee or tea formed during pressing of the beverage. At the center is a pressure-activated valve 40 configured to be closed when the upstream pressure is below a minimum pressure and configured to be open to allow fluid flow therethrough when the upstream pressure in the press is greater than the minimum pressure. In a typical beverage press, the opening pressure is 20 inches of $H_2O$ (+/−3), closing pressure is 10 inches of $H_2O$ (+/−3 inches) and the flow rate 1,250 mL/min (+/−250) at 37 inches $H_2O$. While these parameters are typical, it is appreciated that beverage press designs may vary and these values may differ such that beverage cap designs could be modified to accommodate any variations in beverage press designs. The interior cavity has a bottom surface 33 that slopes downward gently towards the central valve opening to facilitate flow of beverage through the valve during pressing. A plurality of protrusions 34 extend upwards from the bottom surface 33 of the interior cavity and act as supports for the filter and as baffles to restrain or regulate pressure within the interior cavity and along the filter. In this embodiment, the protrusions 34 occupy about 40-60%, typically about 50%, of the bottom surface so as to improve distribution of pressure and improved support along the entire filter. Preferably, the protrusions are discontinuous such that there are multiple spaces between the protrusions in each direction, thereby allowing distribution of pressure during pressing of a beverage. In this embodiment, the protrusions have diamond shapes with a flattened top surface that engages and supports the filter. In this embodiment, the diamond shaped protrusions are arranged in a regular pattern in which there are no direct flow paths from the outer periphery and the central valve opening, which improves distribution of flow and pressure within the interior cavity to avoid uneven forces on a paper filter that would cause blowout. In this embodiment, the diamond shaped protrusions are each about 0.2" long and about 0.1" wide and are arranged to extend in differing directions or orientations. In this embodiment, the four supports on the valve insert are each about 0.1" long and 0.1" wide.

As shown in FIG. 1B, the beverage cap includes an underside recessed portion having a bottom-facing surface 37 that engages with a top surface of a cup (as shown in FIGS. 2-3) and a protruding central region 38 that houses the valve insert and includes a center opening 39 to facilitate flow of the beverage therethrough during pressing. In this embodiment, the main body 35 also includes a meandering raised edge 36 that acts as a gripping feature. The bottom-facing surface 37 can be flat or gently slope to the central protruding region 38. The bottom-facing surface 37 can abut against a top of the vessel (i.e. mug or cup), however, in most uses a lateral support of the press abuts against the top of the vessel and the bottom portion of the beverage cap is received within an open mouth of a vessel which maintains the assembly atop the vessel. It is appreciated that while a particular design is shown here, the main body can be configured according to various other shapes and designs, with or without a gripping feature.

FIGS. 2 and 3 show a beverage press assembly 100 according to a specific embodiment of the invention. Beverage press 1 includes a hollow cylinder 2 having top and bottom openings. The removable beverage cap 30 releasably couples with the bottom of the cylinder and encloses the bottom opening. After tea or coffee grounds and heated water are deposited in the outer cylinder and stirred, a removable piston 4 is inserted into the top opening and pressed downward to force liquid 5 in the cylinder through the cap. The press has a lateral support 6 to support the press assembly on the mouth of an open vessel 7. A filter 8 is captured between the beverage cap 30 and the cylinder 2 to strain particles from the liquid during pressing. As an alternative, the filter can be integrated into the cap structure. Typically, the filter is a removable filter that is placed within the beverage cap before assembly with the press and that is removed after pressing of the beverage for cleaning or discarding. Advantageously, the beverage cap design herein allows for use of a paper filter. It is appreciated that the removable filter can be a disposable filter formed of paper, cloth, textile, or any fiber-based material, woven or non-woven. The beverage cap is also compatible with reusable filters, which can be formed of metal, such as perforated metal plate or metal mesh.

FIG. 2 also shows a stirring paddle 9 having an upper stop 10 and a length, measured from its lower extremity 11 to stop 10, which is slightly less than the length of cylinder 2. The stop prevents the tip 11 of the paddle from touching the beverage cap 3 or the filter 8 during stirring. In operation, the press 1 is assembled as shown and placed atop an open vessel 7. Ground coffee or tea is put into the cylinder 2. Hot water is added and the mixture is stirred with paddle 9. The paddle is then removed and piston 4 is inserted into the top opening and pressed downward to force the liquid 5 through the filter and the interior cavity of beverage cap and through the central valve into the vessel in a stream. The piston pressurizes the air 20, above the liquid and it is this pressurized air which forces the liquid 5 through the cap. When the liquid is expelled, the press is then lifted off the vessel and the cap 3 is removed. Finally, piston 4 can be pressed farther to eject the spent puck 21 of coffee or tea into a waste receptacle. The filter can then be removed and discarded or cleaned.

The piston 4 is capped with a flexible seal 12 to engage the inside of the cylinder. The seal preferably has its maximum diameter 13 at its lowest point in order to wipe clean the inside of the cylinder when the maximum diameter is pushed fully through the cylinder with the cap removed during ejection of the spent puck. The piston 4 has a stop 14 which limits the maximum travel of the piston but permits the maximum diameter 13 of the seal to extend beyond the bottom opening of the cylinder with the cap removed to eject the spent puck.

In FIGS. 2 and 3, beverage cap 30 is attached to cylinder 2 with a twist-lock coupling 16, where male threads or tabs engage corresponding female threads or recesses to secure the beverage cap in place. While a twist-lock mechanism is shown, it is appreciated that various other releasable coupling mechanisms could be employed, for example, snap-fit, interference fit, magnets, latches or any suitable mechanism.

FIG. 4 illustrates an alternative version of the beverage press and beverage cap where the support 6A extends radially outward from beverage cap 30'. This figure also illustrates an alternative attachment method in which the beverage cap is attached to the cylinder with a screw thread 17. Yet still other alternatives could be realized, for example securing the beverage cap to the cylinder with a latch.

The figures in FIGS. 2-4 illustrate that the beverage cap includes a central bottom lip 18 that extends below the rim of the open vessel in order to keep the press from slipping off the vessel. In FIGS. 1 and 2, this bottom step is the lower portion of cap 30. In FIG. 4, bottom step 18 is an extension below the lower surface of beverage cap 30'. The alternative cap and support of FIG. 4 also has an upper cavity 19 to collect liquid which leaks between the cylinder 2 and the cap 30'. In some embodiments, supports 6 and 6A are shaped to permit air to pass readily out of the open vessel when the press is resting on top of the vessel and liquid is entering the vessel. The twist lock 16 of FIG. 2 and FIG. 3 can include through-holes 22 to achieve this. In the alternative of FIG. 4, the bottom surface of support 6A can be roughened or grooved to achieve this same result.

While the cylinder 2 may be made from a wide range of materials, the preferred materials are transparent or semi-transparent so that the user can observe the pressing process. Glass and transparent plastics are suitable materials for the cylinder. While a wide range of dimensions are feasible for the invention, a cylinder having an inside diameter of approximately 2.25 inches and a length of approximately 5 inches has been found to perform very well. While a particular press design has been described in the above example, it is appreciated that the beverage cap and valve insert described herein could be configured for use with various other types of beverage presses having differing design features and dimensions than those described above.

Figure 5:
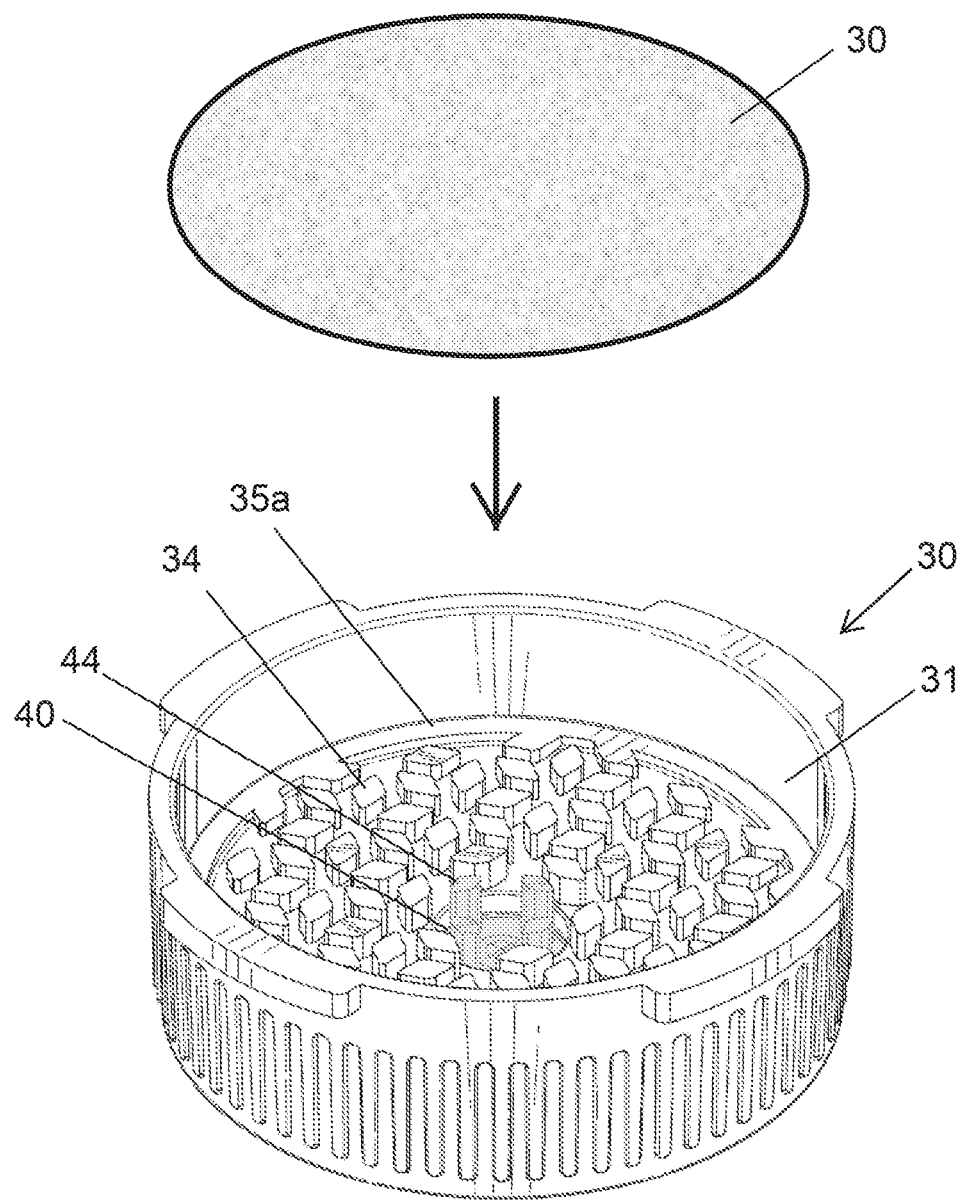
FIG. 5 illustrates the beverage cap of FIGS. 1A-1B with a paper filter being placed in the open cavity before assembling with the beverage press, in accordance with some embodiments.

FIG. 5 shows a paper filter 8 being placed within the beverage cap of FIGS. 1A-1B. As can be seen in FIG. 5, the paper filters are shaped (e.g. a circle) to correspond to the same shape of the interior cavity of the beverage cap so that the outer periphery of the filter engages the raised outer periphery 35a of the interior cavity and is sealed by engagement with the bottom opening of the cylinder when the beverage cap is coupled thereto, for example by the twist-lock mechanisms noted above. As can be appreciated, the plurality of protrusions 34 may be of differing heights based on their location within the interior cavity so that the planar top surfaces extend along a common plane to support the filter paper. Similarly, the additional support members 44 of the valve insert 40 extend to the same horizontal plane to provide additional support of the filter in the valve region.

Figure 6:
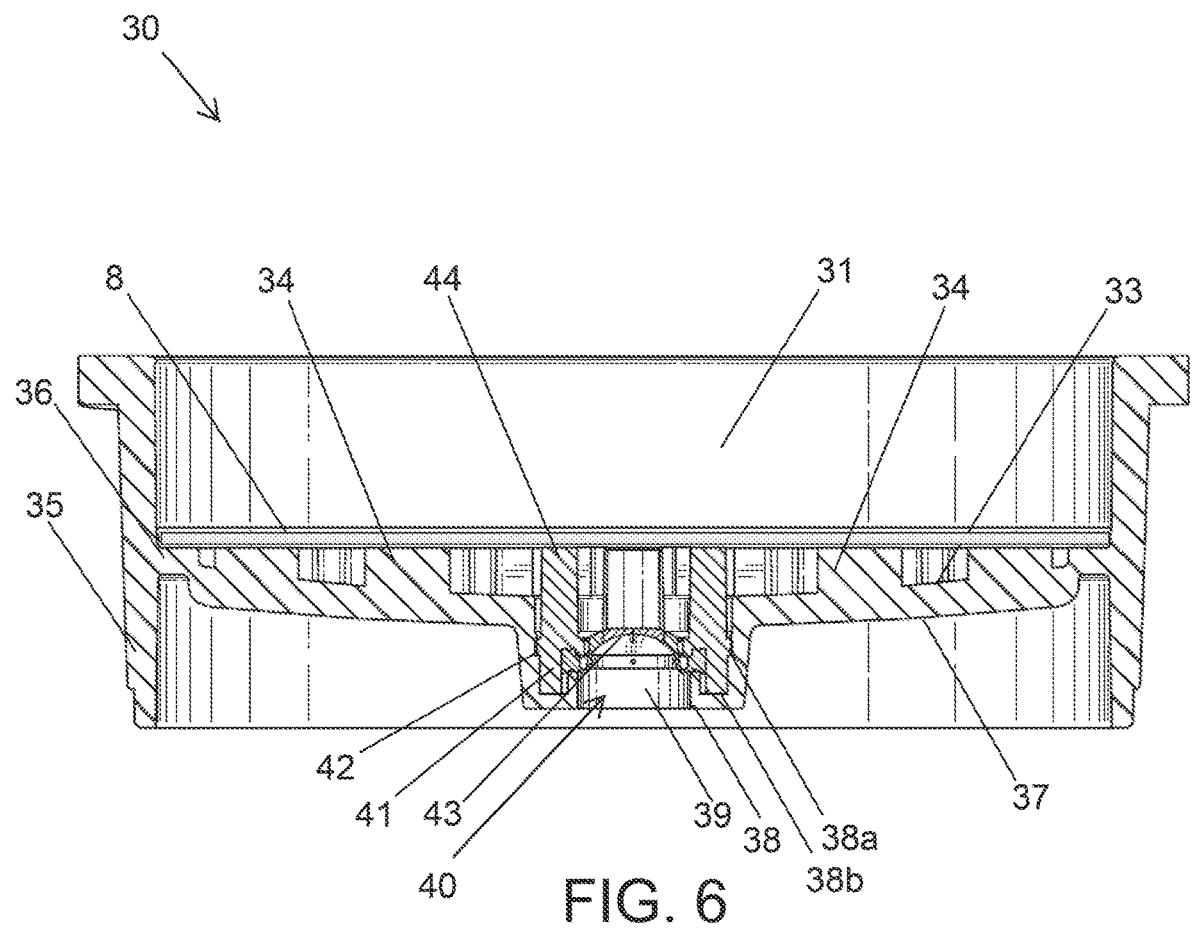
FIG. 6 illustrates a cross-sectional view of the beverage cap of FIGS. 1A-1B with the protrusions of the beverage cap supporting a paper filter before beverage assembling with the beverage press, in accordance with some embodiments.

FIG. 6 shows a cross-section view of the beverage cap 30 supporting a paper filter 8 within the interior cavity 31 of the main body 35. As shown, the paper filter 8 sits atop the top planar surfaces of the plurality of protrusions 34 extending upwards from the bottom surface 33 of the interior cavity, which is gently sloped towards the central opening and valve insert 40. As can be seen, the protrusions are dimensioned so that the top surfaces support the paper filter along a horizontal plane. This view also shows how the valve insert 40 fits within the main body 35. The bottom surface 37 drops down into a recessed central portion defined within the underside protrusion 38. The valve insert 40 is inserted from above and into the interior cavity so that it sits within the recessed portion 38b in the interior the protruding portion 38. A lateral protrusion 42 extending from valve body 41 is fittingly received within a corresponding groove 38a in the recessed central portion when the valve insert is pressed into place to secure the valve insert by a snap-fit coupling between the lateral protrusions and the groove. This snap-fit coupling secures the valve insert 40 within the main body 35 with the movable valve 43 disposed directly over the bottom opening 39. This configuration is advantageous as the valve is confined within the recessed portion and can only be removed from above, which prevents the valve from inadvertently falling into the beverage. Additional details of the valve insert can be seen in FIGS. 10A-1 IC.

Figure 7:
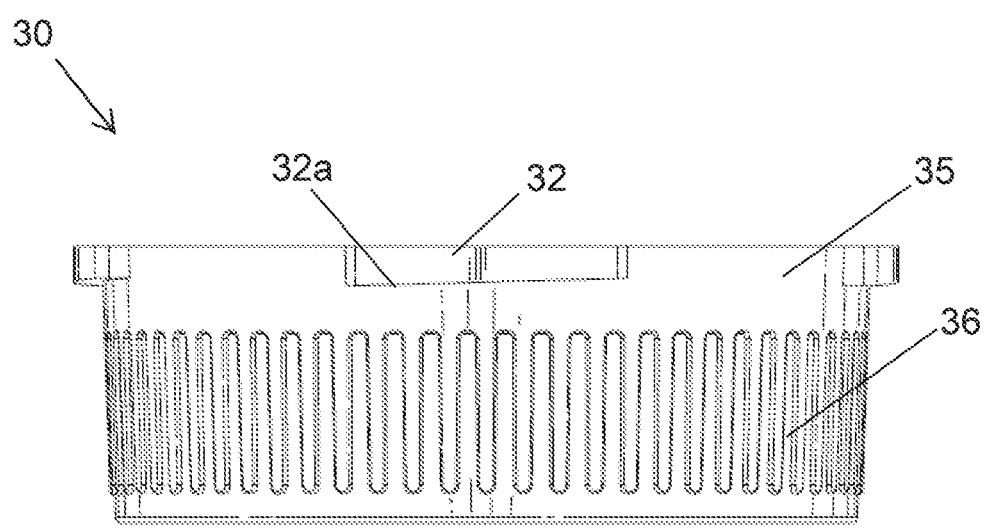
FIG. 7 illustrates an elevational side view of the beverage cap in FIGS. 1A-1B, the beverage cap having rotationally locking tabs and a grip feature along the outside surface, in accordance with some embodiments.

FIG. 7 shows a side view of the beverage cap 30 of FIGS. 1A-1B. The left, right, front and rear views are identical. As shown, the main body includes a twist-lock coupling which includes four male tabs 32 extending from opposite sides of the upper periphery and which are received in corresponding female recesses or slots within the beverage press cylinder support. In this embodiment, the male tab 32 has a sloped underside 32a that increases the engagement force of the coupling when the beverage cap is twisted within the female recesses, thereby providing a sealing engagement between the bottom opening of the cylinder and the outer periphery of the interior cavity of the beverage cup so as to seal the filter in place. This embodiment further includes a meandering grip feature 36 to facilitate manual handling and rotating of the beverage cap. While a particular twist-lock coupling and grip is shown here, it is appreciated that any suitable coupling means or alternative designs could be used.

Figure 8:
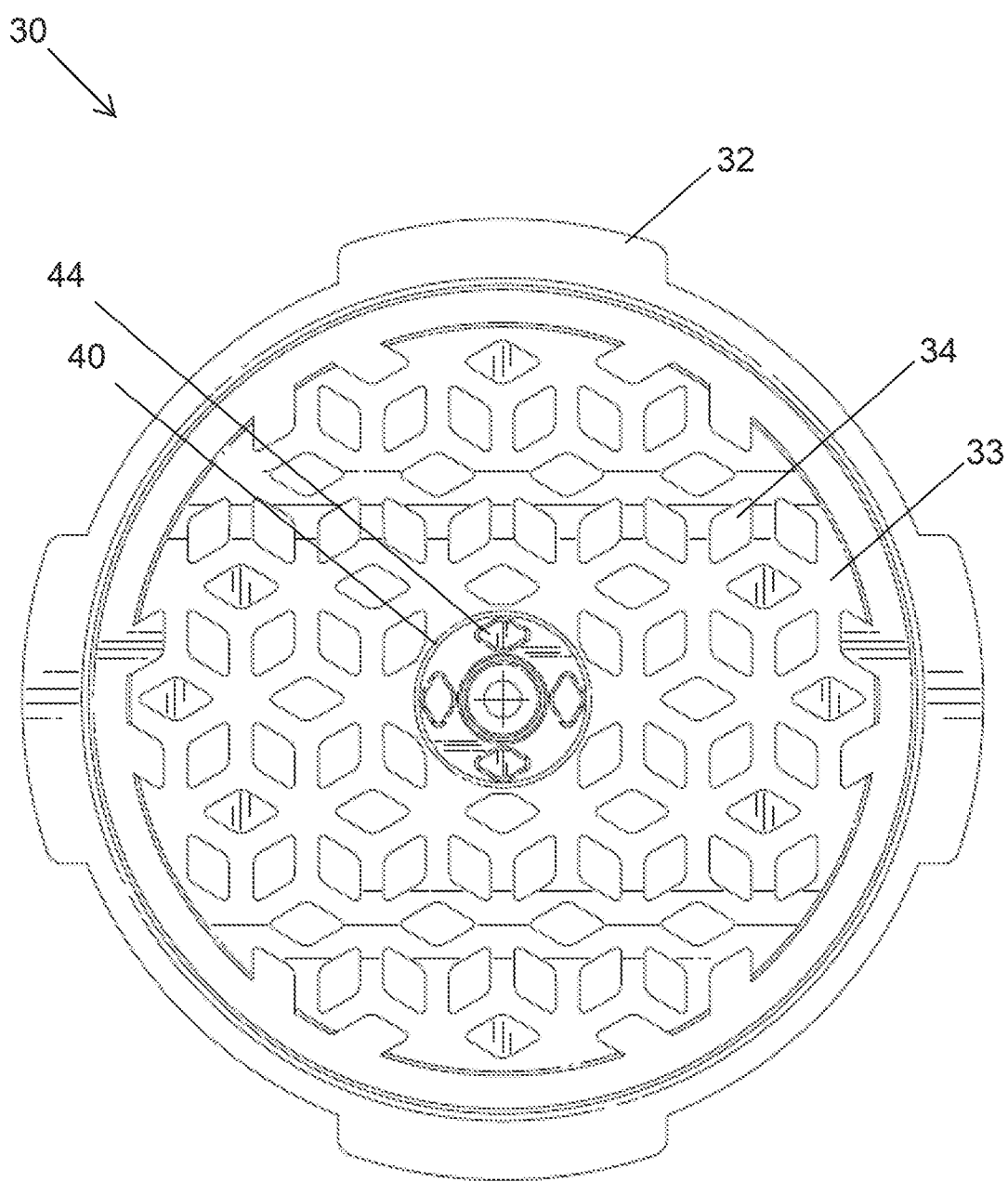
FIG. 8 illustrates a top side view of the beverage cap of FIGS. 1A-1B showing the protrusions of the beverage cap arranged in a regular pattern within the cavity for improved support of the filter and more uniform pressurization, in accordance with some embodiments.

FIG. 8 shows top side view of the beverage cup 30 showing additional details as to the arrangement or pattern of the plurality of protrusions 34 extending from the bottom surface 33 of the interior cavity 31. In this embodiment, the protrusions account for a substantial portion of the area, for example between 30% and 70%, between 40 and 60%, or typically about 50%. In this embodiment, the protrusions 34 are diamond shaped and oriented in differing directions, although it is appreciated the protrusions could be of differing shapes and orientations. In some embodiments, the protrusions are all of the same size and/or shape, while in other embodiments, the protrusions are of differing sizes and/or shapes. In this embodiment, the protrusions 34 are arranged so as to avoid any direct flow paths between the outer periphery and the center valve region. Additionally, the protrusions are distributed in a regular pattern throughout the interior cavity to better support the filter and are discontinuous between the outer periphery and the central region. In some embodiments, the discontinuous protrusions are dimensioned and arranged with multiple spaces between adjacent protrusions in each direction such that the protrusions act as baffles restraining and regulating pressurized flow through the interior cavity to provide more uniform application of pressure to the filter to avoid blowout. Similarly, the valve insert 40 includes support members 44 that extend upwards and support the portion of the filter above or directly adjacent to the valve to further inhibit blow out of the filter in the center region. In this embodiment, there are four support members 44 that are diamond shaped and distributed around the valve. While this embodiment shows a certain shape, number and pattern of protrusions 34 and support members 44, it is appreciated that these elements could be of differing sizes, shapes, numbers or patterns to achieve a similar effect.

Figure 9:
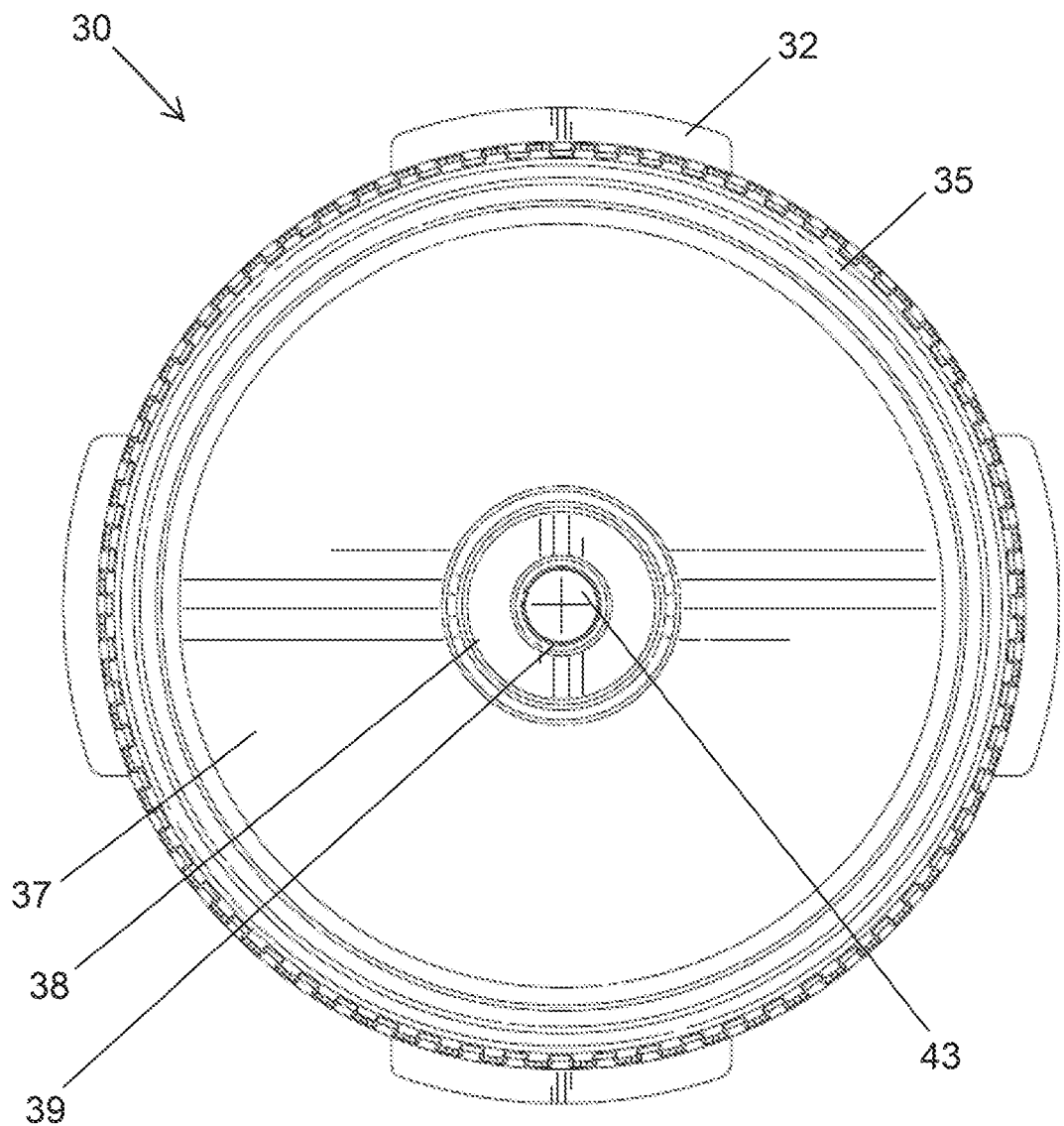
FIG. 9 illustrates a underside view of the beverage press of FIGS. 1A-1B showing the underside surface and central protrusion housing the valve insert, in accordance with some embodiments.

FIG. 9 shows an underside view of the beverage cap of FIGS. 1A-1B. The underside includes a recessed surface 37 that slopes gently toward the central protruding portion 38 that houses the valve insert and includes an opening 39 for passage of fluid flow from the valve. The movable valve member 43 can be seen through the opening 39. In this embodiment, the movable valve member 43 is a dome of pliable material (e.g. elastomer) having one or more slits (e.g. cross-cut slit) that open when the upstream pressure exceeds the minimum pressure.

Figure 10A:
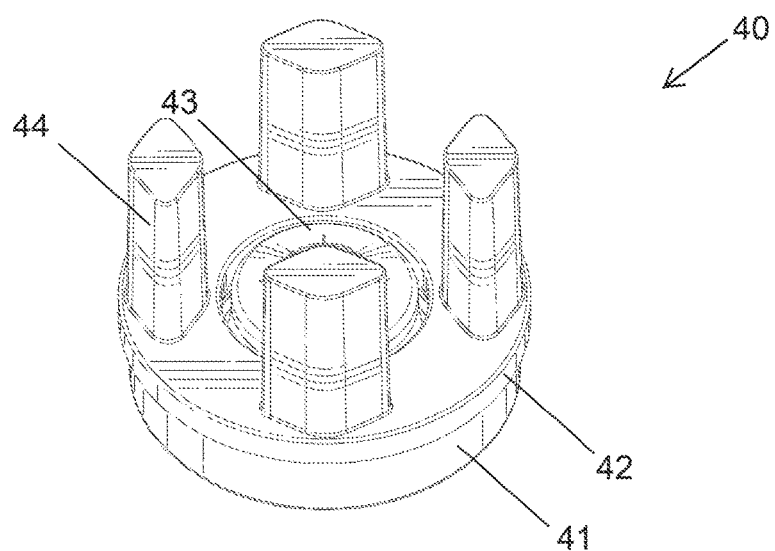
FIGS. 10A-10B illustrate a removable pressure-activated valve insert used in the beverage cap of FIGS. 1A-1B, in accordance with some embodiments.
Figure 10B:
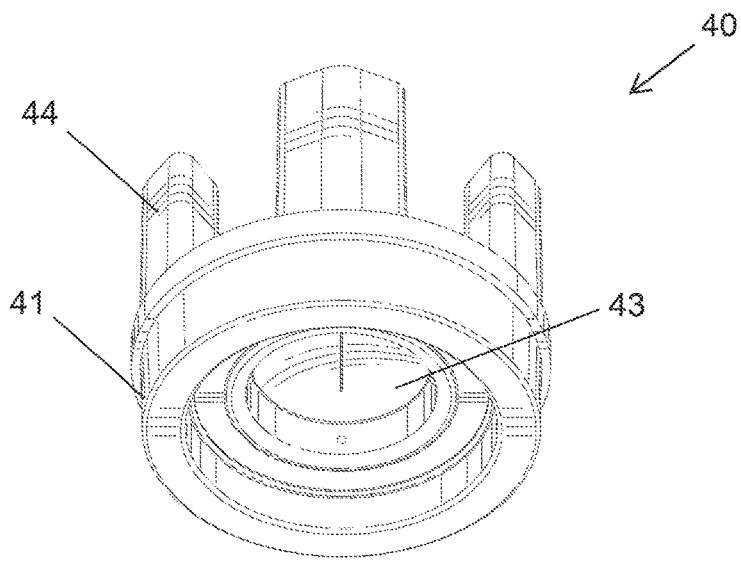
Figure 11A:
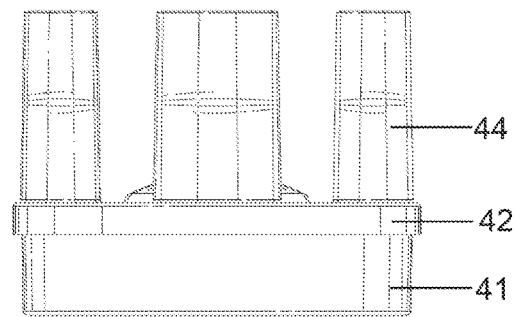
FIGS. 11A, 11B, and 11C illustrate side, top and underside views of the pressure-activated valve insert in FIGS. 10A-10B, in accordance with some embodiments.
Figure 11B:
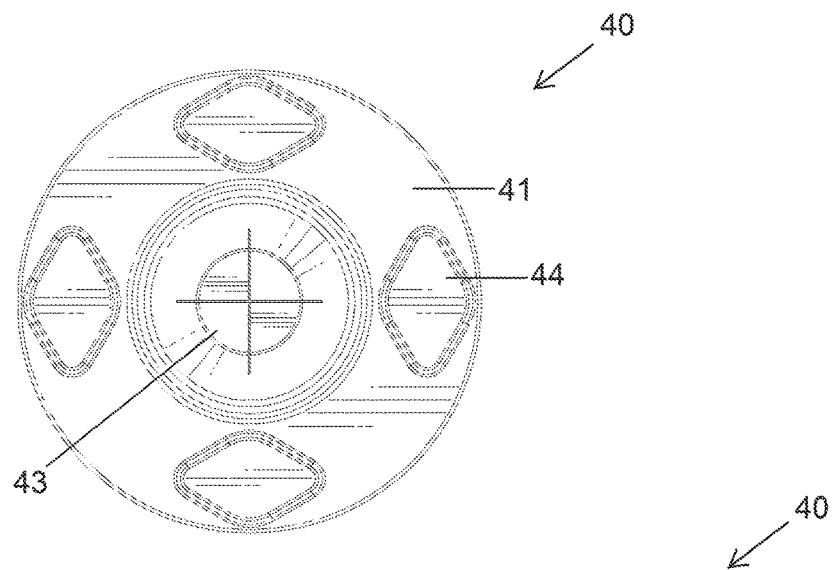
Figure 11C:
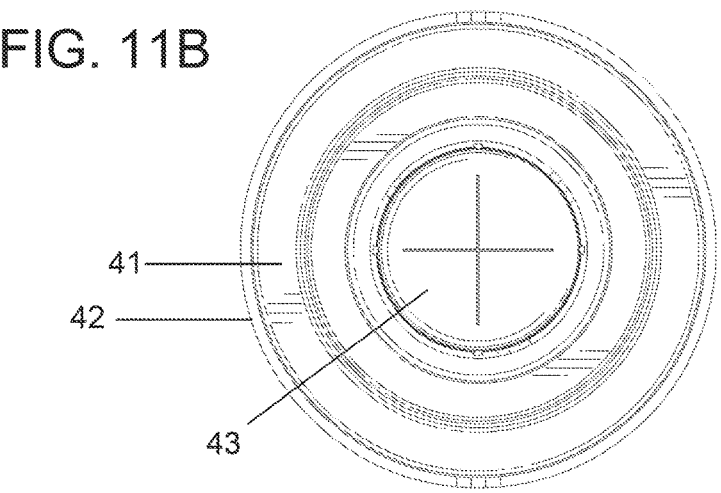

FIGS. 10A-10B show an exemplary valve insert 40, that can be used in the beverage cap of FIGS. 1A-1B, in accordance with some embodiments. As shown, the valve insert 40 includes a valve body 41 having a laterally extending protrusion 42 that acts as a snap-fit coupling with a corresponding groove in the beverage cap body. Multiple support members 44 protrude upwards from the valve body, the support members 44 having a top planar surface for engaging and supporting the filter above and/or directly adjacent the valve so as to prevent blow out of the filter in the center region. At the center, the valve body supports the movable valve member 43, which as shown is a dome shaped membrane having a central cross-cut slit. The movable valve member can be formed of a deformable or flexible layer of material (e.g. elastomeric membrane) attached to the valve body. The valve body and support members can be formed of a rigid or substantially rigid material (e.g. hard plastic or elastomer, semi-rigid elastomer). The valve body and support members can be formed as an integral component or can be separate components joined together. The valve insert 40 can be provided as a separate piece for replacement of a spent or defective valve insert in an existing beverage cap. FIGS. 11A, 11B and 11C show an elevational side view, top view and underside view of the valve insert 40, respectively. FIG. 11A shows the side profile of the circular valve body 41, the laterally extending protrusion 42 at the top of the valve body and multiple support members 44 extending upwards form the top surface of the valve body. FIG. 11B depicts a top view of valve insert 40 showing the four diamond-shaped support members 44 distributed around the valve member 43 at center. FIG. 1 IC depicts the underside of valve insert 40 showing the underside of the movable valve member 43, which is a domed elastomeric membrane with cross slit. The movable valve member can be coupled to the valve body by any suitable means, such as a snap-fit coupling or being overmolded within the valve body. While a particular design of the valve unit is depicted here, it is appreciated that the valve insert could include various other coupling mechanism (e.g. corresponding male/female threads, tabs, magnets, etc.) and could include support members of various other sizes, shapes and dimensions (e.g. square, round, polygonal, or oblong shapes) arranged at varying orientations or patterns.

Figure 12A:
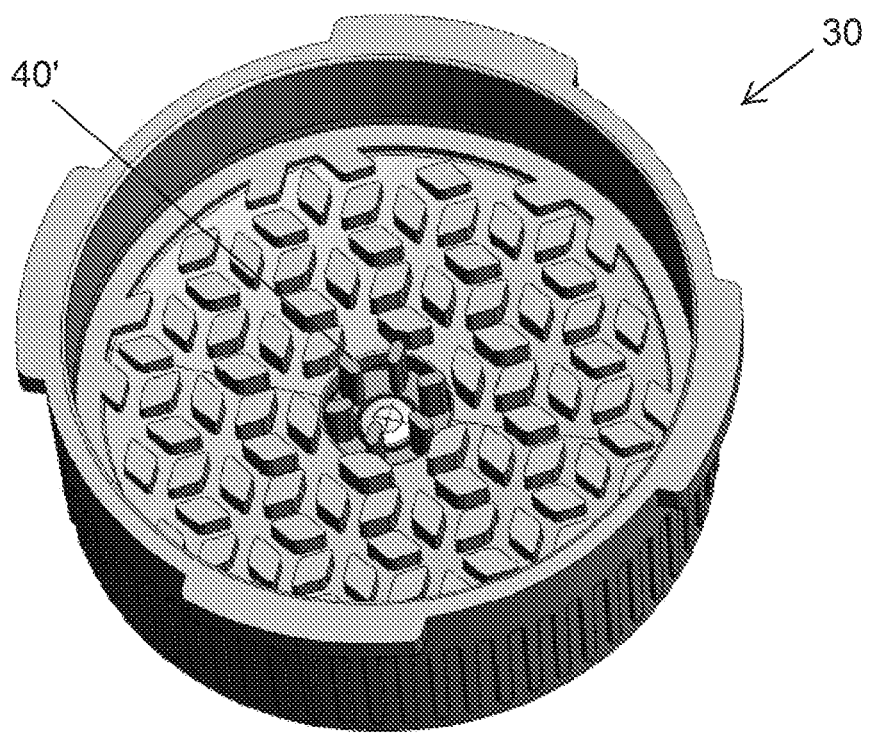
FIGS. 12A-12B show a beverage cap having a removable pressure-activated valve of an alternative design, in accordance with some embodiments.
Figure 12B:
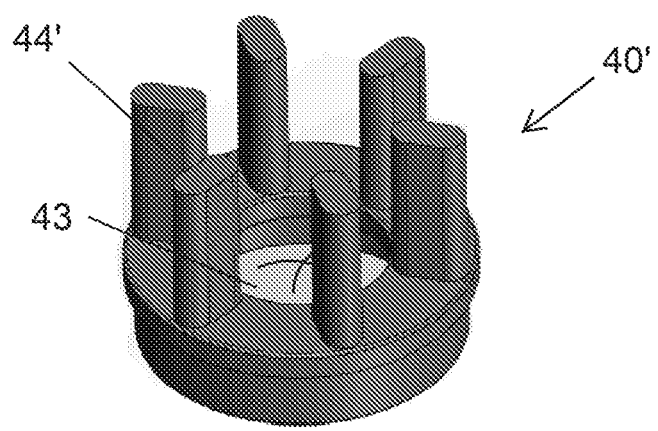

FIG. 12A shows another embodiment of a beverage cap 30 having an alternative design of a valve insert 40', a detail view of which is shown in FIG. 12B. In this embodiment, the valve insert 40' includes six support members 44', each having an oblong pill-shape. The valve insert 40' can otherwise include any of the features or attributed described previously.

FIGS. 13-16 show alternative designs of beverage caps having differing sizes, shapes and patterns of protrusions within the interior cavity, in accordance with some embodiments. As in previous embodiments, these designs include a plurality of protrusions that are configured to support the filter and promote more uniform pressure distribution. In these embodiments, the protrusions are discontinuous between the outer periphery and the central valve region and that are distributed evenly in a pattern substantially without direct flow path between the outer periphery and the central valve region so as to more uniformly distribute pressured flow and avoid areas of increased pressure that contribute to blow out of paper filters. In some embodiments, the beverage caps include at ten protrusions or greater (e.g. 10 or more, 20 or more, 30 or more) to support the filter.

Figure 13:
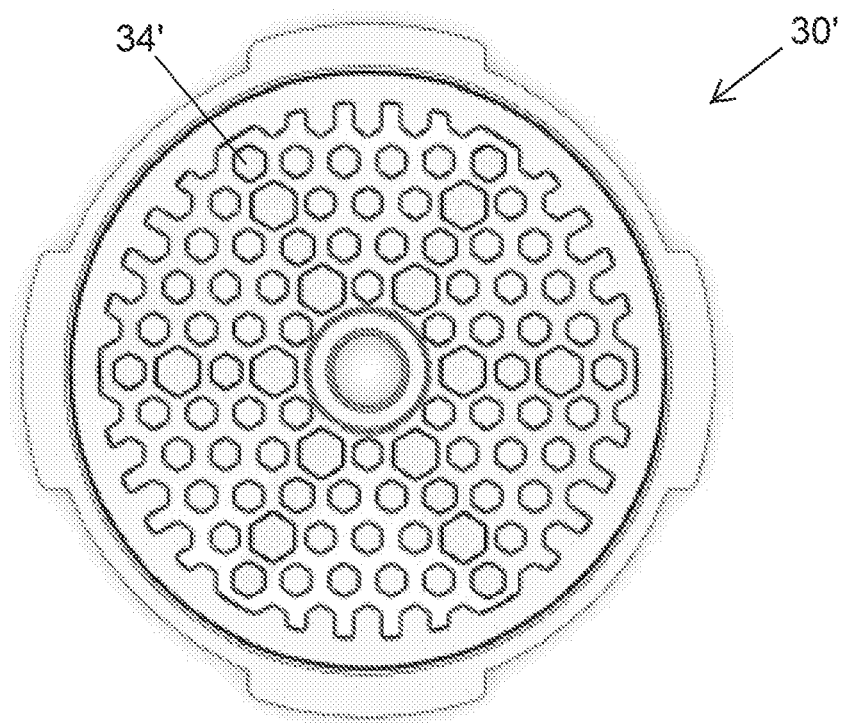
FIG. 13 shows an alternate design of a beverage cap in accordance with some embodiments (valve inserts not shown).
Figure 14:
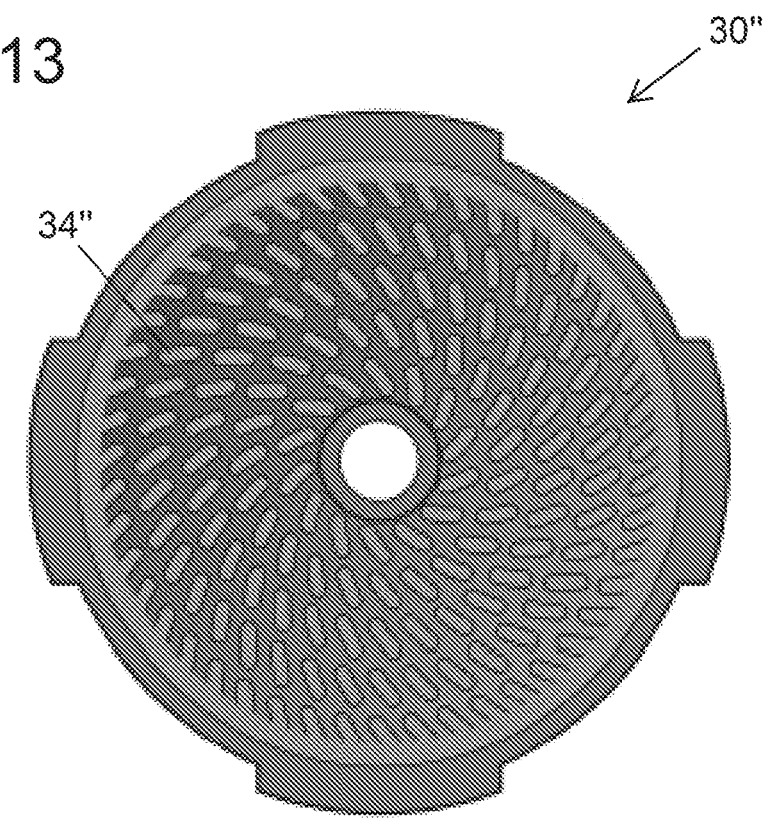
FIG. 14 shows an alternate design of a beverage cap in accordance with some embodiments (valve inserts not shown).
Figure 15:
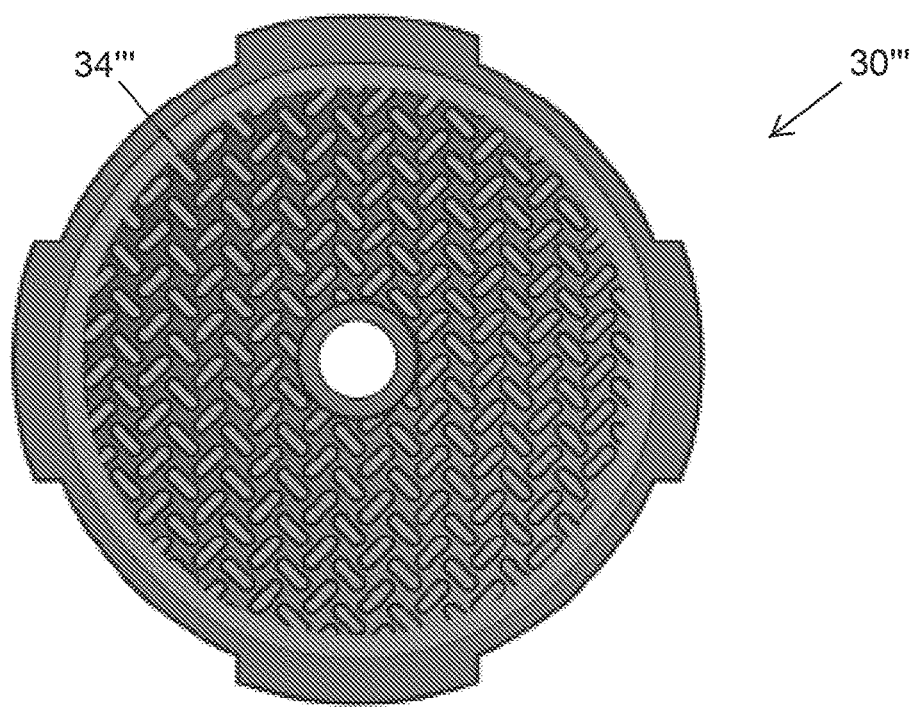
FIG. 15 shows an alternate design of a beverage cap in accordance with some embodiments (valve inserts not shown).
Figure 16:
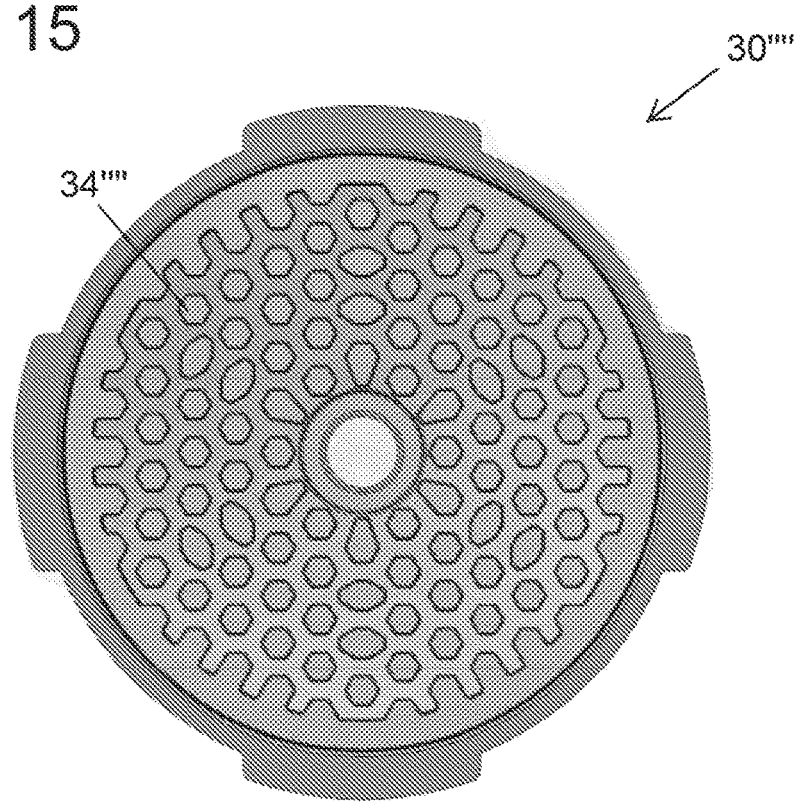
FIG. 16 shows an alternate design of a beverage cap in accordance with some embodiments (valve inserts not shown).

FIG. 13 shows a beverage cap 30' having a plurality of protrusions 34' of polygonal shapes of differing sizes. FIG. 14 shows beverage cap 30" having a plurality of protrusions 34" having oblong pill-shapes that are slightly curved and arranged in a spiral pattern about the central valve region. FIG. 15 shows beverage cap 30'" having a plurality of protrusions 34'" having oblong pill-shapes that are linear and arranged in an alternating criss-cross pattern. FIG. 16 shows beverage cap 30"" having a plurality of protrusions 34"" having differing polygonal shapes (e.g. regular and irregular polygons) and of differing sizes arranged in a complex pattern.

While the above is a complete description of specific embodiments of the invention, the above description should not be taken as limiting the scope of the invention as defined by the claims. Various features, embodiments and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It is recognized that the terms "comprising," "including," and "having," as used herein, are specifically intended to be read as open-ended terms of art, and the term "about" means +/−10% of the recited value.

What is claimed is:

1. A beverage cap for a beverage filter press, the beverage cap comprising:
   a main body having an upper side and a lower side, the tipper side having an open cavity for receiving a filter therein, wherein the main body is configured to releasably couple with a cylinder of a beverage press and enclose a bottom opening of the cylinder when coupled thereto;
   wherein the tipper side of the main body has a bottom surface within the open cavity and a central opening to facilitate passage of fluid during filtering with the beverage press,
   wherein the main body comprises a plurality of protrusions extending upwards from the bottom surface in the open cavity to support the filter received within the open cavity,
   wherein the plurality of protrusions are discontinuous between the central opening and an outer periphery of the open cavity and distributed evenly across the bottom surface so as to distribute pressurized fluid flow within the beverage cap and
   wherein the plurality of protrusions are arranged to avoid direct flow paths from the outer periphery of the open cavity and the central opening, thereby distributing pressure along within the open cavity and along the filter and more uniformly supporting the filter so as to inhibit filter blow out when used with a paper filter; and
   a pressure-activated valve disposed within the main body, wherein the pressure-activate valve is configured in a closed configuration when pressure within the open cavity during filtering with the beverage press is less than a minimum pressure and to assume an open configuration to facilitate fluid flow therethrough when the pressure during filtering with the beverage press is greater than the minimum pressure, the valve comprising a lateral protrusion that is fittingly received within a corresponding groove within the central opening when the valve is pressed into place to secure the valve in the main body.

2. The beverage cap of claim 1, wherein the plurality of protrusions are disposed on between 40 and 60% of the bottom surface of the open cavity.

3. The beverage cap of claim 1, wherein the plurality of protrusions are discontinuous and distributed in a substantially regular pattern across the bottom surface.

4. The beverage cap of claim 1, wherein each of the plurality of protrusions has a largest lateral dimension of about 0.5 inch or less.

5. The beverage cap of claim 1, wherein each of the plurality of protrusions has a planar top surface area of about 0.25 square inches or less.

6. The beverage cap of claim 1, wherein the plurality of protrusions comprises a plurality of elongated shapes that alternate between differing orientations.

7. The beverage cap of claim 1, wherein the open cavity is without any ridges defining designated flow channels from an outer periphery of the open cavity to any openings in the bottom surface of the open cavity, thereby distributing pressure within the cavity and along the filter.

8. The beverage cap of claim 1, wherein each of the plurality of protrusions are arranged so that a distance between protrusion is within a range between 0.05 inches and 0.3 inches.

9. The beverage cap of claim 8, wherein the plurality of protrusions are spaced at regular intervals throughout the open cavity.

10. The beverage cap of claim 1, wherein the plurality of protrusions are arranged in a staggered pattern to increase pressure and turbulence in the open cavity during pressing a coffee beverage to facilitate formation of a crema layer.

11. The beverage cap of claim 1, wherein the pressure-activated valve is removably coupled within the main body by tabs configured to couple by a snap-fit.

12. The beverage cap of claim 1, wherein the pressure-activated valve comprises a removable valve insert comprising:
   a valve body;
   a movable valve member attached to and supported by the valve body, wherein the movable valve member is movable between the open and closed configuration to facilitate flow therethrough; and
   a plurality of support members extending upwards to support the filter above and/or adjacent to a movable membrane.

13. The beverage cap of claim 12,
   wherein the plurality of support members comprise three or more support members distributed around the movable valve member.

14. The beverage cap of claim 1, wherein each of the plurality of protrusions has a largest lateral dimension of 0.5 inch or less, and wherein the plurality of protrusions cover between 40% and 60% of the bottom surface of the open cavity.

15. The beverage cap of claim 14, wherein each of the plurality of protrusions has a planar top surface area of 0.25 square inches or less.

16. The beverage cap of claim 15, wherein a distance between protrusions is within a range between 0.05 inches and 0.3 inches.

17. The beverage cap of claim 16, wherein the protrusions are spaced at regular intervals throughout the cavity in a staggered pattern.

18. The beverage cap of claim 1, wherein the protrusions each have a diamond shape with a flattened top surface that engages and supports the filter.

19. The beverage cap of claim 18, wherein the plurality of protrusions, each having the diamond shape, alternate between differing orientations thereby distributing pressure within the cavity and along the filter.

20. A beverage press assembly comprising:
a hollow cylinder having top and bottom openings;
a removable piston configured to be inserted into the top opening and pressed downward to force liquid in the cylinder; and
the beverage cap of claim 1 removably coupled with and enclosing the bottom opening of the hollow cylinder.

21. The beverage press assembly of claim 20, wherein the plurality of protrusions are discontinuous and distributed in a substantially regular pattern across the bottom surface of the open cavity of the beverage cap to support the paper filter and provide more uniform pressure distribution to inhibit blow out of the paper filter.

22. A removable valve insert for a beverage cup, the removable valve insert comprising:
a valve body;
a movable valve member comprising a movable membrane, the movable valve member attached to and supported by the valve body, wherein the movable valve member is configured with a closed configuration when upstream pressure is less than a minimum pressure and to assume an open configuration to facilitate fluid flow therethrough when the upstream pressure is greater than the minimum pressure; a lateral protrusion extending from the valve body that is configured to be fittingly received within a corresponding groove within a central opening of a main body of the beverage ca when the valve is pressed into lace to secure the valve in the beverage cap; and and
wherein the valve body comprises a plurality of support members extending upwards to support a filter above the movable membrane during pressing of a beverage when the removable valve insert is attached within a beverage cap sealingly coupled with a beverage press.

23. The removable valve insert of claim 22, wherein the plurality of support members comprise three or more support members distributed about the movable valve member disposed at the center of the valve body.

24. The removable valve insert of claim 23, wherein the plurality of support members comprise at least four support members.

25. The removable valve insert of claim 22, wherein the valve body and the plurality of support members are integrally formed.

26. The removable valve insert of claim 25, wherein the valve body and the one or more support members are formed of a rigid or semi-rigid plastic or elastomer.

27. The removable valve insert of claim 22, wherein the movable membrane of the valve member is a flexible membrane having one or more slits defined therein, the valve member being a separate and distinct component from the valve body.

28. A beverage cap for a beverage filter press, the beverage cap comprising:
a main body having an upper side and a lower side, the upper side having an open cavity for receiving a filter therein, wherein the main body is configured to releasably couple with a cylinder of a beverage press and enclose a bottom opening of the cylinder when coupled thereto;
wherein the upper side of the main body has a bottom surface within the open cavity and a central opening to facilitate passage of fluid during filtering with the beverage press,
wherein the main body comprises a plurality of protrusions extending upwards from the bottom surface in the open cavity to support the filter received within the open cavity,
wherein the plurality of protrusions are discontinuous between the central opening and outer periphery and distributed across the bottom surface so as to distribute pressurized fluid flow within the beverage cap,
wherein the plurality of protrusions having a largest lateral dimension of about 0.5 inch or less and a distance between protrusions is between range between 0.05 inches and 0.3 inches, and the plurality of protrusions are spaced at regular intervals throughout the cavity in a staggered pattern,
wherein the plurality of protrusions are arranged to avoid direct flow paths from the outer periphery of the open cavity and the central opening, thereby distributing pressure along within the open cavity and along the filter and more uniformly supporting the filter so as to inhibit blow when used with a paper filter; and
a pressure-activated valve disposed within the main body, wherein the pressure-activate valve is configured in a closed configuration when pressure within the open cavity during filtering with the beverage press is less than a minimum pressure and to assume an open configuration to facilitate fluid flow therethrough when the pressure during filtering with the beverage press is greater than the minimum pressure, the valve comprising a lateral protrusion that is fittingly received within a corresponding groove within the central opening when the valve is pressed into place to secure the valve in the main body.

29. The beverage cap of claim 28, wherein the protrusions each have a diamond shape with a flattened top surface that engages and supports the filter, and wherein the plurality of protrusions each having the diamond shape alternate between differing orientations thereby distributing pressure within the cavity and along the filter.

30. The beverage cap of claim 28, wherein the open cavity is without any ridges defining designated flow channels from an outer periphery of the open cavity to any openings in the bottom surface of the open cavity, thereby distributing pressure throughout the cavity and along the filter.

* * * * *

UNITED STATES PATENT AND TRADEMARK OFFICE
CERTIFICATE OF CORRECTION

PATENT NO. : 12,053,114 B1
APPLICATION NO. : 18/099790
DATED : August 6, 2024
INVENTOR(S) : Matthew Brown, Dale Woiken and Edmund Lee Page 1 of 1

It is certified that error appears in the above-identified patent and that said Letters Patent is hereby corrected as shown below:

In the Claims

In Column 11, Line 32: "tipper side having" should read -- upper side having --.

In Column 11, Line 37: "wherein the tipper side" should read -- wherein the upper side --.

In Column 13, Line(s) 31-33: "of the beverage ca when the valve is pressed into lace to secure the valve in the beverage cap; and and" should read -- of the beverage cap when the valve is pressed into place to secure the valve in the beverage cap; and --.

Signed and Sealed this
Twenty-sixth Day of November, 2024

Katherine Kelly Vidal
*Director of the United States Patent and Trademark Office*